United States Patent [19]

Tsukada et al.

[11] Patent Number: 5,333,020
[45] Date of Patent: Jul. 26, 1994

[54] SPROCKET WHEEL FOR ADVANCING FILM AND DEVICE FOR ADVANCING FILM USING SAID SPROCKET WHEEL

[75] Inventors: Makoto Tsukada; Yutaka Tokue, both of Tokyo, Japan

[73] Assignee: Imagica Corp., Kyoto, Japan

[21] Appl. No.: 93,689

[22] Filed: Jul. 20, 1993

[30] Foreign Application Priority Data

Apr. 2, 1993 [JP] Japan .................. 5-077058

[51] Int. Cl.⁵ .............................................. G03B 1/00
[52] U.S. Cl. .................................. 352/166; 352/187; 352/190; 352/191
[58] Field of Search ............... 352/166, 183, 187, 190, 352/191, 192, 194; 226/76, 78, 82, 83, 84, 85

[56] References Cited

U.S. PATENT DOCUMENTS

| | | | |
|---|---|---|---|
| 1,851,448 | 3/1932 | Ross | 352/194 |
| 2,594,466 | 4/1952 | Luther | 352/190 |
| 2,788,703 | 4/1957 | Holman | 352/187 |
| 2,953,965 | 9/1960 | Stiffler | 352/184 |
| 4,053,214 | 10/1977 | Brucat | 352/191 |
| 4,215,921 | 8/1980 | Miller et al. | 352/187 |
| 4,402,581 | 9/1983 | Bauer | 352/192 |
| 4,534,630 | 8/1985 | Williamson | 352/194 |
| 4,697,896 | 10/1987 | Fox | 352/180 |
| 4,863,262 | 9/1989 | Berggren et al. | 352/187 |
| 4,892,404 | 1/1990 | Blaschek | 352/192 |
| 4,896,960 | 1/1990 | Williamson | 352/193 |
| 5,050,985 | 9/1991 | Shaw et al. | 352/184 |
| 5,225,860 | 7/1993 | Blaschek | 352/192 |

FOREIGN PATENT DOCUMENTS

5-224301  9/1993  Japan .

Primary Examiner—Michael L. Gellner
Assistant Examiner—Eddie C. Lee
Attorney, Agent, or Firm—Oblon, Spivak, McClelland, Maier & Neustadt

[57] ABSTRACT

Mounted on a horizontal shaft 1 extending along surfaces of a film f are sprocket wheels 2 each having three tooth pairs 2a adapted to engage with perforations on the film. The tooth pairs 2a are angularily spaced apart from each other by 120 degrees around a periphery of the sprocket wheel 2. A triangular cam 11 is attached on one end of a horizontal shaft 7 rotatable in unison with the shaft 1. A lever 17 is attached to a horizontal shaft 15 carrying a cam follower 16 rotatable in unison with the rotation of the cam 11. A projection 20 which reciprocates registration pins 22 for engagement with and disengagement from the perforations g of the film f is fitted into an elongated slot 17a of the lever 17. A switching lever 14 is provided for displacement of the shaft 7 into a position where the shaft 7 is prevented from rotating even when the horizontal shaft 1 is rotated.

3 Claims, 9 Drawing Sheets

Fig. 1

PRIOR ART

Fig. 2

PRIOR ART

SPROCKET WHEEL FOR ADVANCING FILM AND DEVICE FOR ADVANCING FILM USING SAID SPROCKET WHEEL

BACKGROUND OF THE INVENTION

The present invention relates to a sprocket wheel for advancing a film in a movie camera, a movie projector, a film printer or a telecine and to a device for advancing a film using said sprocket wheels.

Figure 1:
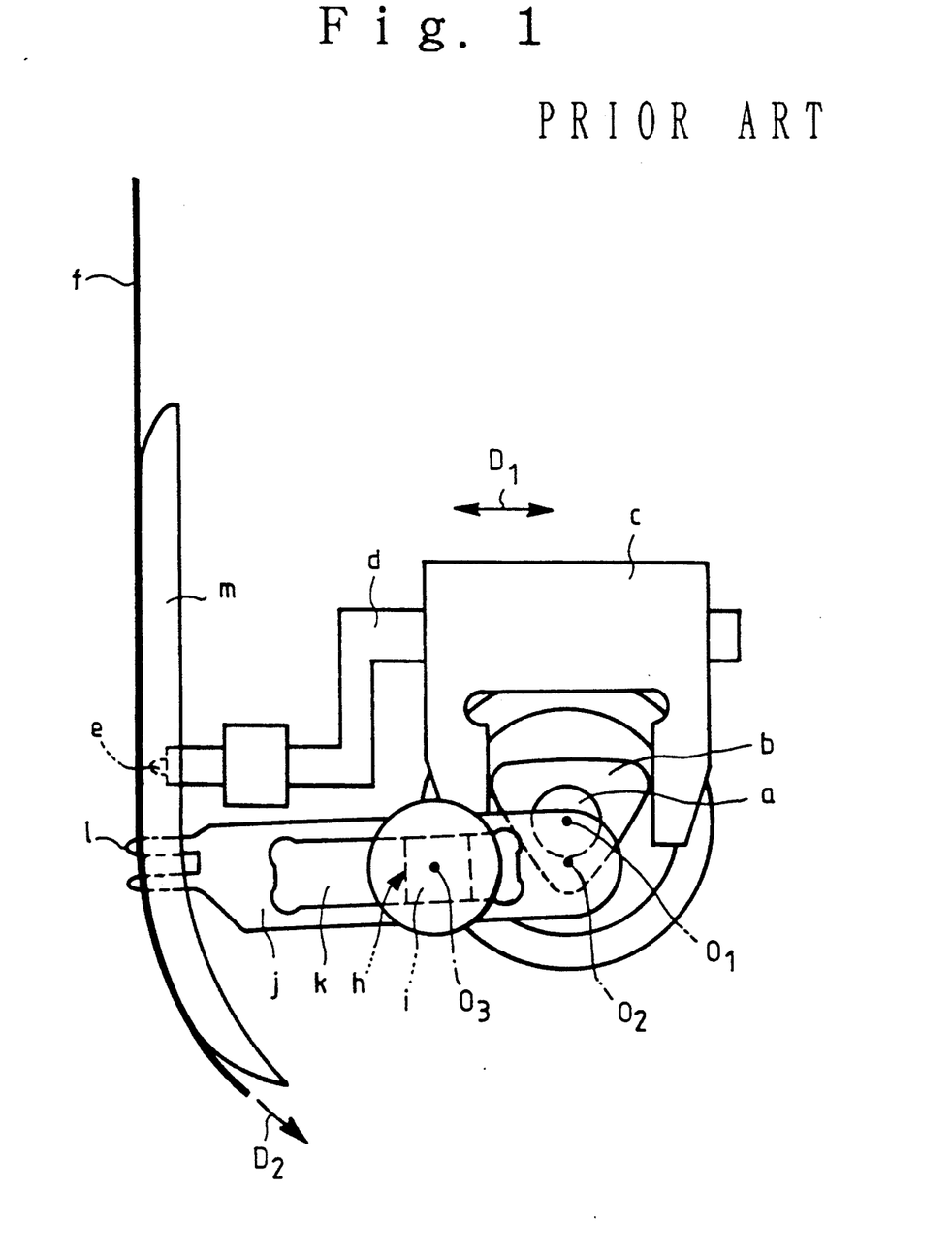
FIG. 1 is a schematic side view of a conventional film advancement device.

A conventional device for advancing a film one frame at a time in a movie camera, a movie projector, a film printer or a telecine is shown in FIG. 1.

Figure 2:
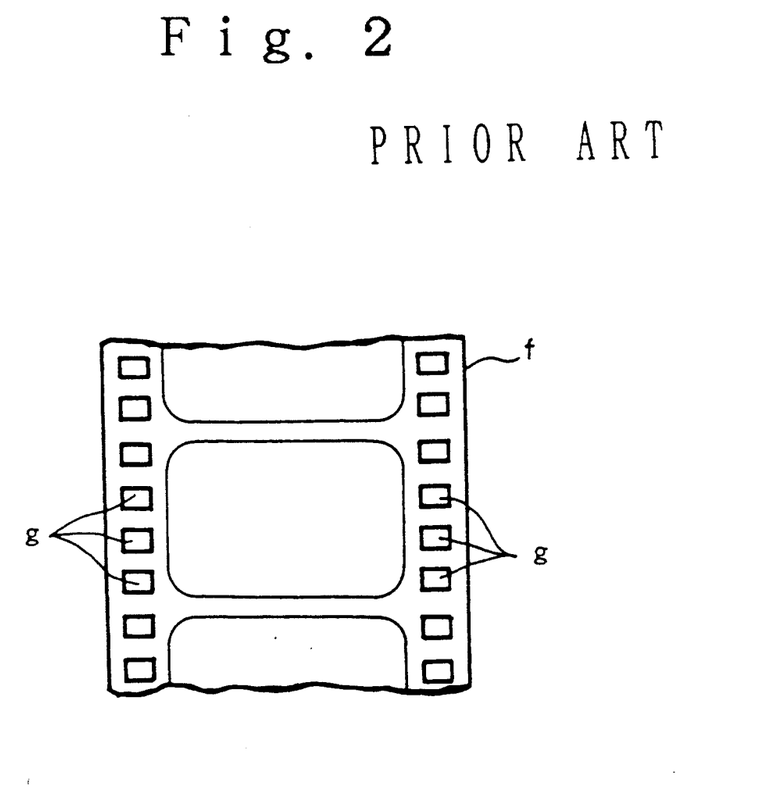
FIG. 2 is a front view of a conventional film for projection.

In FIG. 1, reference character a denotes a horizontal shaft supported by bearings (not shown) so as to be driven by a motor (not shown); b, a triangular cam attached to the horizontal shaft a; c, a cam follower in the form of a yoke which diametrically clamps the cam b and which is horizontally reciprocable in a direction of double-pointed arrow $D_1$ depending upon rotation of the cam b; d, an arm mounted on the cam follower c in parallel with the direction of reciprocation of the follower c; e, registration pins attached to a free end of the arm d so as to be disengaged from perforations g on a film f at opposite sides thereof (See FIG. 2) by reciprocal movement of the cam follower c upon the advancement of the film f.

Reference character h designates a further horizontal shaft rotatably supported by bearings (not shown) and having a portion i rectangular in section; and j, a further arm with a rectangular opening k through which the arm j is slidably fitted over the portion i. The arm j has one end to which claws 1 are attached so as to engage with the perforations g shown in FIG. 2 by rotation of the cam b upon the intermittent or frame-by-frame advancement of the film f. The other end of the arm j is pivoted on the cam b at a point $0_2$ eccentric to an axis $0_1$ of rotation of the cam b.

Further, reference character m denotes a guide of the film f. Though not shown, there are take-off and take-up reels upwardly and downwardly of the film f shown in FIG. 1 so as to wind off the film f and wind up the unwound film f traveling in a direction of arrow $D_2$, respectively.

In the conventional film advancement device shown in FIG. 1, the motor (not shown) is driven to rotate the horizontal shaft a which in turn rotates the triangular cam b. Rotation of the cam b causes the cam follower c to be moved toward and away from the film f, which causes the registration pins e at the free end of the arm d to be engaged with and disengaged from the perforations g. The arm j is also moved toward and away from the film f to engage and disengage the claws 1 with and from the perforations g.

In frame-by-frame advancement of the film f, the cam b is rotated in a counterclockwise direction to respectively disengage the pins e from and engage the claws 1 with the perforations g and to slide the arm j relative to the portion i and swing the same about an axis $0_3$ of the shaft h. As a result, the claws 1 are displaced downwardly to advance the film f only one frame at a time in the direction $D_2$.

When the advancement of the film f by one frame is finished, the arm j is retracted to disengage the claws 1 from the perforations g to thereby stop the film f; and the cam follower c is advanced to engage the pins e with the perforations g to thereby hold the film f in position so as to be immovable vertically and horizontally. While the the film f is being stopped in position, the cam b is further rotated to return the arms d and j to their initial positions and to respectively disengage the pins e with and engage the claws 1 with the perforations g. This step is repeated to intermittently advance the film one frame at a time.

Another example of conventional film advancement devices is disclosed in U.S. Pat. No. 4,697,896 in which a motor is driven to rotate sprocket wheels for advancing a film. In the system, intermittent advancement of the film by one frame is carried out such that feed or advanced length of the film is determined on the basis of number of rotations per unit time of a motor which is detected by a tachometer as well as number of interruptions per unit time of light beam by a slot disk mounted coaxially with the sprocket wheels or number of transits per unit time of light beam through a slot on the slot disk. That is, advancement of the film by a predetermined length is arithmetically grasped to de-energize the motor and stop the film.

The prior art shown in FIG. 1 has the following problems or disadvantages:

(i) The mechanism for advancing the film is much complicated in structure and in movement so that fast-forward or the like advancement of the film at high speed cannot be carried out by the mechanism itself;

(ii) when it is therefore desired to advance the film at high speed, the film f must be removed or disengaged from the film advancement system shown in FIG. 1 and threaded through a specially designed mechanism so that the whole installation becomes larger-scale; and (iii) in the case the system shown in FIG. 1 being used for a movie camera or a telecine where a film to be advanced has been developed and therefore has perforations with deteriorated accuracy, excessive force tends to act on the film f by means of the claws 1 in frame-by-frame advancement of the film, resulting in any damages such as fracture of the film f at a corner of the perforation g.

In the film advancement device disclosed in U.S. Pat. No. 4,697,896, advancement and stoppage of the film are electrically carried out so that there arises a problem of frame-by-frame advancement of the film and holding of the same in position being carried out with a low degree of accuracy as compared with the devices using the registration pins.

In view of the above, a primary object of the present invention is to improve accuracies in frame-by-frame advancement of a film and in holding of the same in position so that even in a high speed film advancement, no additional device or installation is required and damages to the film is eliminated.

BRIEF SUMMARY OF THE INVENTION

A sprocket wheel for advancing a film in accordance with the present invention has some peripheral wheel portions with no tooth so that teeth of the wheel does not engage with perforations of the film in stoppage of the film during frame-by-frame movement of the same.

A device for advancing a film according to the present invention comprises a first shaft extending laterally of the film and having sprocket wheels with some peripheral portions with no tooth so that when the film is stopped, teeth of the sprocket wheel do not engage with perforations of the film, a second shaft extending substantially in parallel with the first shaft and having a cam, first power transmission means for interconnecting the first and second shafts, a third shaft extending substantially in parallel with said second shaft having a cam follower for diametrically clamp said cam and second power transmission means, said third shaft being adapted to be rotated through said cam follower by rotation of the cam and a fourth shaft extending perpendicular to said third shaft and adapted to be reciprocated axially of the fourth shaft by said second power transmission means, said fourth shaft having registration pins engageable with the perforations of the film upon stoppage of the film during frame-by-frame advancement of the film. The first power transmission means for interconnecting the first and second shafts may be releasable and further means may be provided which may increase a film part-winding angle relative to the sprocket wheels (See FIG. 5 and corresponding description) such that any one or more of the teeth of the sprocket wheels normally engages with the perforations of the film.

According to the present invention, frame-by-frame advancement and stoppage of the film can be readily carried out by merely continuously driving the sprocket wheel without using a linkage which performs complicated motion or without using electric control.

When the film is to be stopped, the registrations pins engage with the perforations of the film so that holding of the film in position is ensured.

According to the present invention, besides frame-by-frame advancement of the film, a high speed advancement of the film may be carried out with no need of transferring the film to any other device or equipment. This is due to the fact that any of the teeth of the sprocket wheel may normally engage with the perforations of the film by releasing the first power transmission means and increasing the film part-winding angle relative to the sprocket wheel.

THE PREFERRED EMBODIMENT OF THE PRESENT INVENTION

Figure 3:
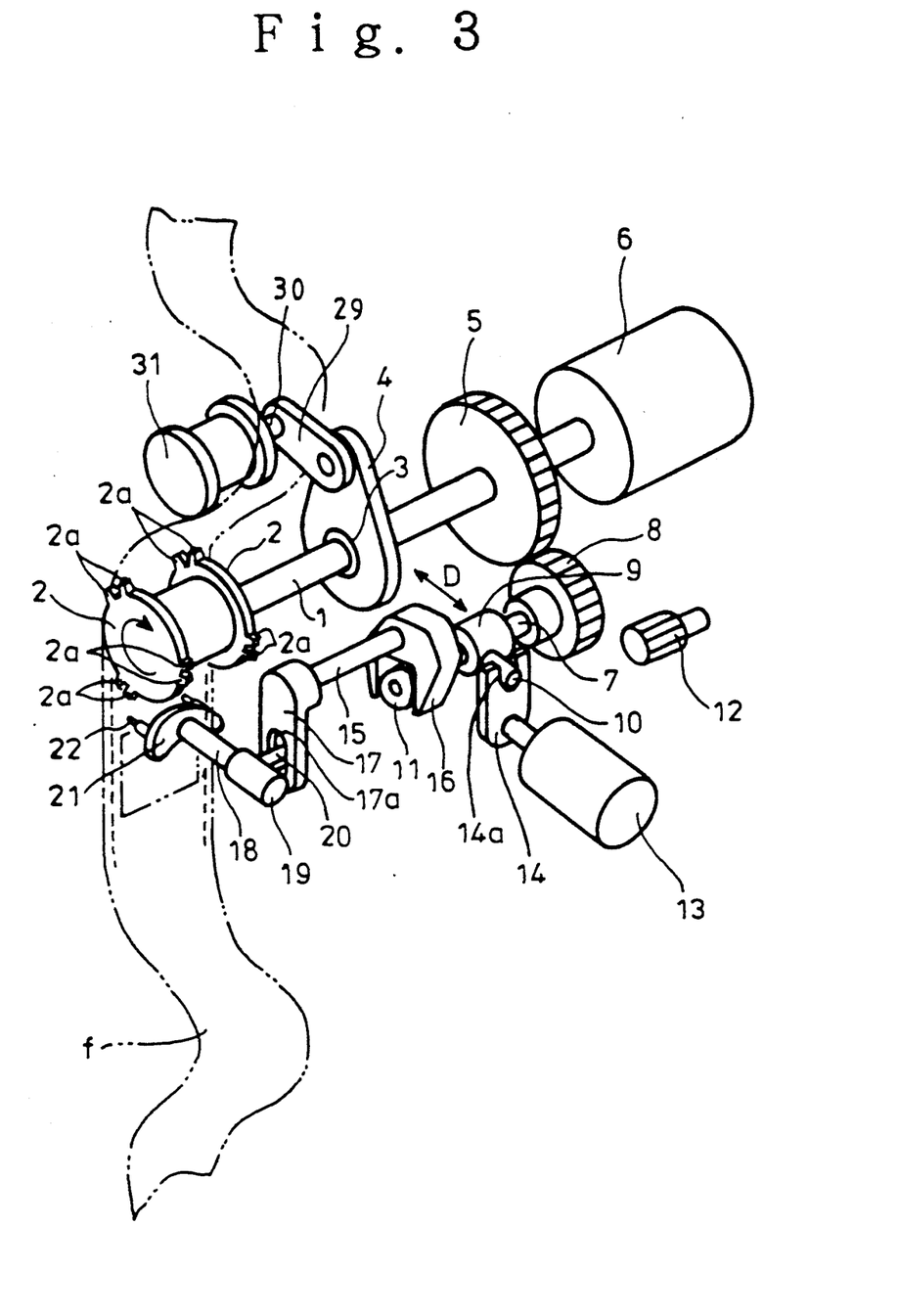
FIG. 3 illustrates a preferred embodiment of a sprocket wheel for advancing a film and a device for advancing a film using said sprocket wheels and is a perspective view of a film guide in a position for frame-by-frame advancement of the film.
Figure 4:
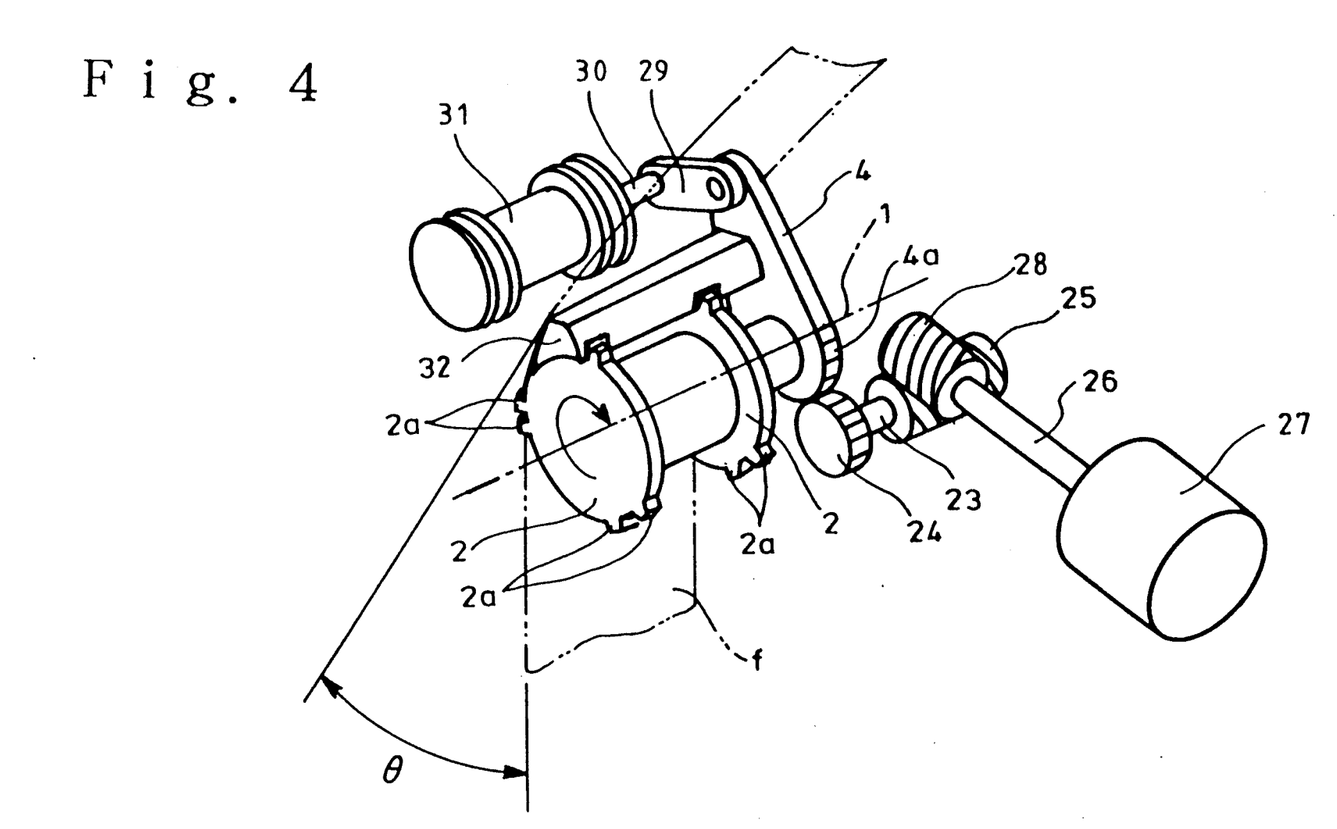
FIG. 4 illustrates the embodiment and is a perspective view of a drive mechanism for urging a film part-winding roll into a position for a high speed film advancement.
Figure 5:
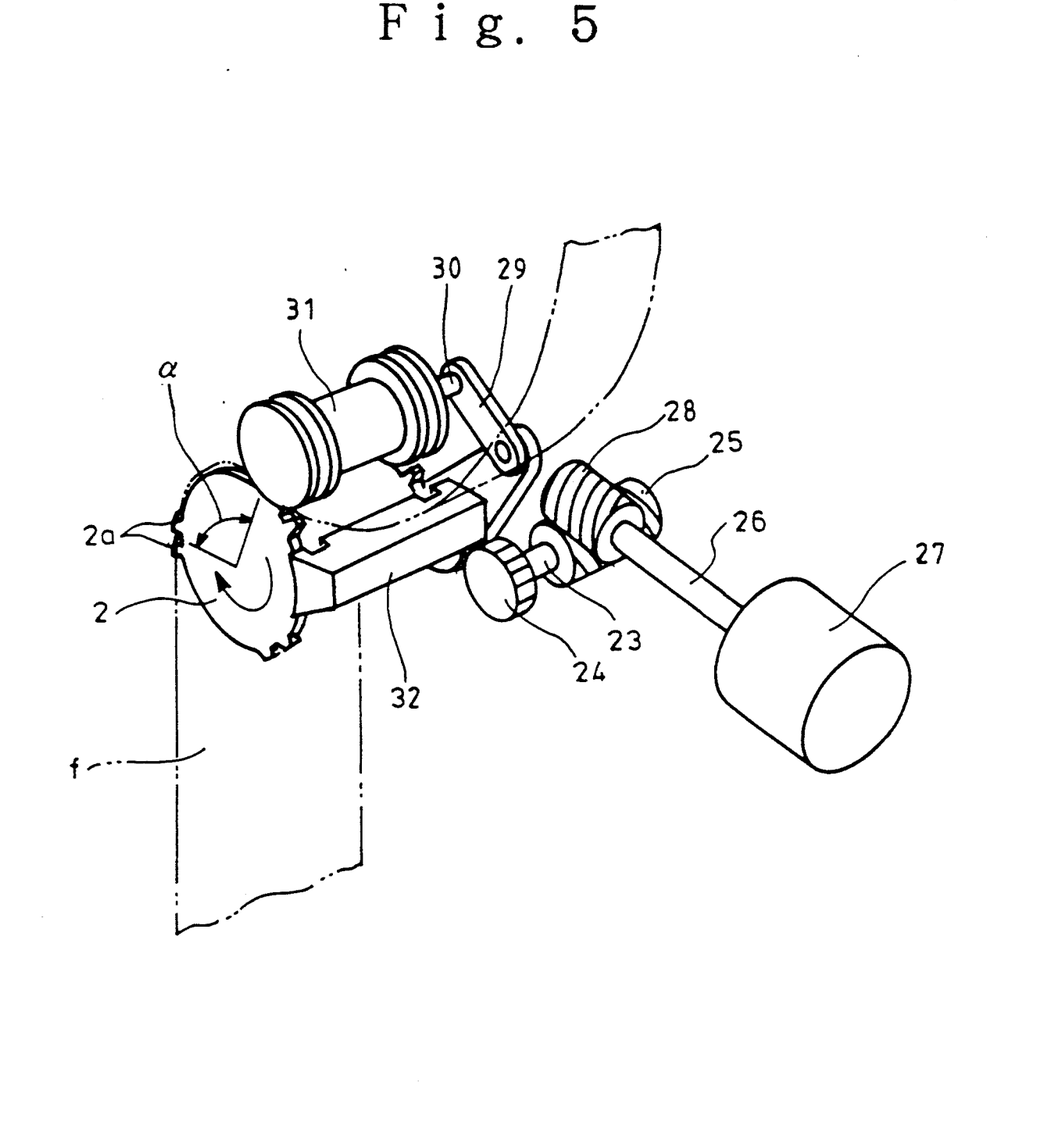
FIG. 5 illustrates the embodiment and is a perspective view showing the film part-winding roll being urged into the position for the high speed film advancement.
Figure 6:
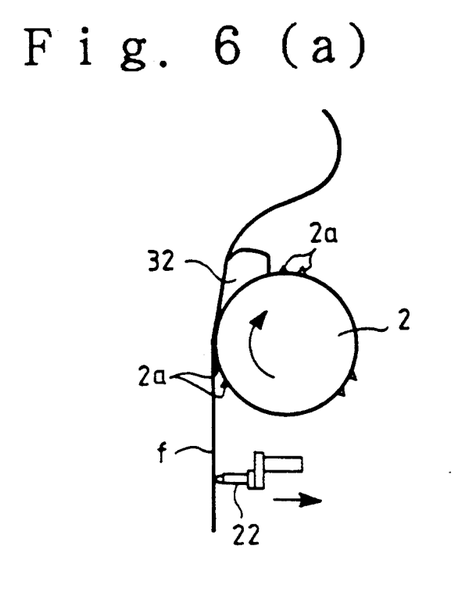
FIGS. 6(a), 6(b), 6(c) and 6(d) are schematic side views showing movements of the sprocket wheel and registration pins in frame-by-frame advancement of the film in the embodiment.

Referring now to FIGS. 3-5, a preferred embodiment of the present invention will be described with reference to frame-by-frame advancement of a 35 mm movie film with four perforations per frame at opposite sides.

A horizontal shaft 1 is rotatably supported by bearings (not shown) in parallel with surfaces of the film f. The shaft 1 has one end to which two sprocket wheels 2 are attached in a mutually spaced-apart relationship along an axis of the shaft 1. The other end of the shaft 1 is connected with a motor 6. Between the opposite ends of the shaft 1, a lever 4 is rotatably fitted through a bush 3 on the shaft 1 and a gear 5 is attached to the shaft 1.

Each sprocket wheel 2 is made of a gear with 24 teeth of which 18 teeth have been removed such that three tooth pairs 2a are equiangularly spaced apart substantially by 120 degrees. Each tooth pair 2a is adapted to engage with and disengage from the perforations g of the film f (See FIG. 2) as the sprocket wheels 2 rotate.

A horizontal shaft 7 is rotatably and axially slidably supported by bearings (not shown) in parallel with the horizontal shaft 1. The shaft 7 has one end to which a triangular cam 11 known per se is attached. The other end of the shaft 7 is connected with a gear 8 which is adapted to detachably engage with the gear 5. Between the opposite ends of the shaft 7, a boss 9 is mounted on the shaft 7 such that the boss 9 is rotatable about the shaft 7 and is adapted to be displaced integral with the shaft 7 along an axis of the shaft 7. The boss 9 has a periphery from which a projection 10 extends horizontally and radially of the boss 9.

A gear 12 is unrotatably disposed adjacent to the gear 8 and is engageable therewith upon disengagement of the gear 8 from the gear 5. A motor 13 is disposed adjacent to the boss 9 and is connected to a fork-shaped lever 14 with a U-shaped recess 14a at its upper end, which engages with the projection 10, such that the lever 14 can reciprocate axially of the shaft 7.

A horizontal shaft 15 is rotatably supported by bearings (not shown) in parallel with the first horizontal shaft 1. The shaft 15 has one end to which a lever 17 extending downwardly and formed with a vertically elongated slot 17a is attached. A yoke-shaped cam follower 16 is mounted on the other end of the shaft 15 adjacent to the cam 11 to clamp the cam 11 diametrically of the cam 11 such that upon rotation of the cam 11, the cam follower 16 is caused to swing in a direction of double pointed arrow D.

A horizontal shaft 18 is rotatably supported by bearings (not shown) below the lever 17 such that the shaft 18 extends perpendicular to the the shaft 15 and is displaceable axially of the shaft 18. The shaft 18 has one end to which a bracket 21 is attached which in turn has registration pins 22 spaced apart from each other horizontally and diametrically of the shaft 18 below the sprocket wheels 2 so as to engage with and disengage from the perforations g of the film f. The other end of the shaft 18 is connected with a boss 19 which has an outer periphery from which in turn a projection 20 extends radially of the boss 19 to be fitted into the slot 17a.

Teeth ratio between the gears 5 and 8 is 3:1 so that whenever the sprocket wheels 2 make a rotation, the registration pins 22 accomplish three strokes axially of the shaft 18. That is, the pins 22 engage with and disengage from the perforations g of the film f three times. The position relationship of the gears 8 and 12 is so selected that when the gear 8 disengages from the gear 5 to mesh with the gear 12, no rotation of the gear 8 is permitted.

Referring next to FIG. 4, a horizontal shaft 23 is rotatably supported by bearings (not shown) in parallel with the first horizontal shaft 1. The shaft 23 has one end to which a gear 24 is attached for engagement with a sector gear 4a defined at a lower end of the lever 4. The other end of the shaft 23 is connected with a worm wheel 25 which is in mesh with a worm gear 28 carried by an output shaft 26 of a motor 27, the output shaft 26 extending perpendicular to the shaft 23.

An arm 29 is attached at its one end to the lever 4. The other end of the arm 29 is connected with one end of a horizontal shaft 30 extending in parallel with the first horizontal shaft 1. The shaft 30 rotatably carries, at its other end remote from the arm 29, a film part-winding roll 31 which is displaceable along peripheries of the sprocket wheels 2 circumferentially thereof by rotation of the lever 4. The lever 4 carries, at its inner surface adjacent to the sprocket wheels 2, a film guide 32 which provides angularily displacement of the film f by $\theta$ for enabling frame-by-frame advancement of the film so that upon rotation of the lever 4, the film guide 32 rotates in unison therewith, thereby moving the peripheries of the sprocket wheels 2 in the circumferential direction thereof.

Next the mode of operation of the preferred embodiment described above will be explained in detail referring to FIGS. 2, 6(a), 6(b), 6(c), 6(d), 7, 8 and 9.

In frame-by-frame advancement of the film at projection speed, the motor 13 is de-energized to maintain the lever 14 in its vertical position. The gear 8 is in mesh with the gear 5 and the motor 27 is de-energized so that the lever 4 remains at a position shown in FIG. 4 and the film guide 32 is held in a position of providing the film angular displacement angle $\theta$.

Under such circumstances, the motor 6 is driven to rotate the horizontal shaft 1 and thus the sprocket wheels 2 in the direction indicated by the arrow in FIGS. 3 and 4. When the tooth pairs 2a of the sprocket wheels 2 do not engage with the perforations g, the sprocket wheels 2 rotate only so that the film remains still; but when the tooth pairs 2a of the sprocket wheels 2 are in mesh with the perforations g, the film is advanced upwardly by the rotation of the sprocket wheels 2. While the sprocket wheels 2 make one rotation, the tooth pairs 2a repeat the engagement with and disengagement from the perforations g three times so that the film is intermittently moved by three frames.

The rotation of the horizontal shaft 1 is transmitted through the gears 5 and 8, the horizontal shaft 7 to the triangular cam 11. As a consequence, the cam follower 16 is moved toward and away from the surfaces of the film f reciprocally as indicated by the double-pointed arrow D and the shaft 15 and lever 17 are also reciprocated in the direction indicated by the arrow D. In response to the swinging motion of the lever 17, the horizontal shaft 18 is reciprocated axially thereof. When the film f is not being moved, the registrations pins 22 engage with the perforations g of the film f so that the film f is still whereas when the teeth 2a of the sprocket wheels 2 are engaged with the perforations g, the registration pins 22 are disengaged from the perforations g so as to move the film.

Since the film f is held in position in the manner described above by the registration pins 22, holding of the film f is ensured with a higher degree of accuracy. The teeth 2a of the sprocket wheels 2 are generally in the form of involute gear so that they smoothly engage with the perforations g of the film f and therefore the film f becomes free from wear and tear in frame-by-frame advancement.

When the film f is to be moved at high speed, in the state of the registration pins 22 being disengaged from the perforations g, the motor 6 is de-energized and the motor 13 is energized to rotate the lever 14 which in turn displaces the horizontal shaft 7 axially thereof through the projection 10 and the boss 9. As a result, the gear 8 is disengaged from the gear 5 and is made in mesh with the gear 12. Thickness of the cam 11 may be so selected that it cannot be disengaged from the cam follower 16 at all irrespective of axial movement of the horizontal shaft 7, which advantageously results in that even in displacement of the gear 8 into mesh with the gear 12, the cam 11 is not disengaged from the cam follower 16 and that the gear 8 is smoothly re-engageable with the gear 5.

The motor 27 is energized to rotate the gear 28 through the output shaft 26. The rotation of the gear 28 is transmitted through the gear wheel 25 and horizontal gear 23 to the gear 24 which is in mesh with the sector gear 4a of the lever 4. Therefore, the lever 4 rotates to displace the guide surface of the film guide 32 away from the surfaces of the film f as shown in FIG. 5 and rotates along the sprocket wheels 2 forwardly of the plane of the paper. The film part-winding roll 31 is also rotated along the sprocket wheels 2 forwardly of the paper plane to partly wind the film f over the peripheries of the sprocket wheels 2. As a result, a film part-winding angle $\alpha$ to the sprocket wheels 2 (See FIG. 5) is increased so that the teeth 2a of the sprocket wheels 2 are normally or always in mesh with the perforations g of the film f.

Therefore, with the registration pins 22 being disengaged from the perforations g of the film f, the gear 8 is made out of mesh with the gear 5 and the film part-winding roll 31 increases the film part-winding angle $\alpha$ to the sprocket wheels 2 and consequently any of the tooth pairs 2a always engage with the perforations g of the film f. Thereafter, both the motors 13 and 13 are de-energized while the motor 6 is energized so that the horizontal shaft 1 and the sprocket wheels 2 rotate and any one of the three tooth pairs 2a of the sprocket wheel 2 is always in engagement with the perforations g of the film f. Therefore, the film f is continuously advanced at high speed in a stable manner. The gear 8 is in mesh with the gear 12 which is stationary and unrotatable so that the reciprocal movement of the registration pins 22 is prevented.

According to the present invention, continuous advancement of the film f at high speed may be carried out by the sprocket wheels 2 used in frame-by-frame advancement so that it becomes unnecessary to transport the film f to any other equipment in high-speed film advancement. Since the tooth pairs 2a of the sprocket wheels 2 smoothly engage with the perforations g of the film f, any wear and tear of the film is prevented even in high-speed film advancement. The motor 6 may be repeatedly energized and de-energized to carry out frame-by-frame advancement without use of the registration pins 22.

When the high-speed continuous advancement of the film is to be switched to the intermittent frame-by-frame advancement, the motor 6 is de-energized such that the tooth pairs 2a of the sprocket wheels 2 are brought to a final position of frame-by-frame film advancement stroke. Thereafter, the motor 13 is energized to rotate the lever 14 and therefore displace the gear 8 toward the gear 5 through the projection 10, boss 9 and horizontal shaft 7. Therefore, the gear 8 is disengaged from the gear 12 into mesh with the gear 5. Concurrently, the triangular cam 11 is inserted into the cam follower 16 and the motor 27 is energized to rotate the output shaft 26 so that the lever 4 is retracted from the position shown in FIG. 5 backwardly of the paper plane through the worm 28, worm wheel 25, horizontal shaft 23, gear 24 and sector gear 4a to thereby return the film part-winding roll 31 and the film guide 32 to their initial positions shown in FIG. 4. Therefore, a phase relationship between the tooth pairs 2a of the sprocket wheels 2 and the registration pins 22 remains unchanged so that the high-speed film advancement mode can be smoothly switched into the intermittent frame-by-frame film advancement mode.

FIGS. 6(a), 6(b), 6(c) and 6(d) illustrate the position relationship between the tooth pairs 2a of the sprocket wheels 2, the registration pins 22 and the film guide 32.

FIG. 6(a) shows that the sprocket wheel 2 rotating in the direction of the arrow starts to engage at an upper tooth of a tooth pair 2a with the perforation g of the film f while the registration pins 22 are disengaged from the perforations g such that free ends of the pins 22 are slightly spaced apart from the surfaces of the film f. That is, FIG. 6(a) illustrates the start of the frame-by-frame advancement stroke of the film. FIG. 6(b) shows that beth the teeth of the tooth pair 2a adjacent to the surfaces of the film f are in engagement with the perforations g of the film f while the registration pins 22 is retracted furthest from the surfaces of the film f. That is, FIG. 6(b) illustrates the film f being in frame-by-frame advancement. FIG. 6(c) shows that the upper tooth of the tooth pair 2a adjacent to the surfaces of the film f has already been disengaged from the perforation g and the lower tooth of the tooth pair 2a is about to disengage from the perforation g while the registration pins 22 are about to engage with the perforations. That is, FIG. 6(c) shows the state just before the end of the film displacement stroke. FIG. 6(d) indicates that the tooth pair 2a are disengaged from the perforations g while the registration pins 22 are about to engage with the perforations g. That is, FIG. 6(d) illustrates the film f being still in position.

Figure 8:
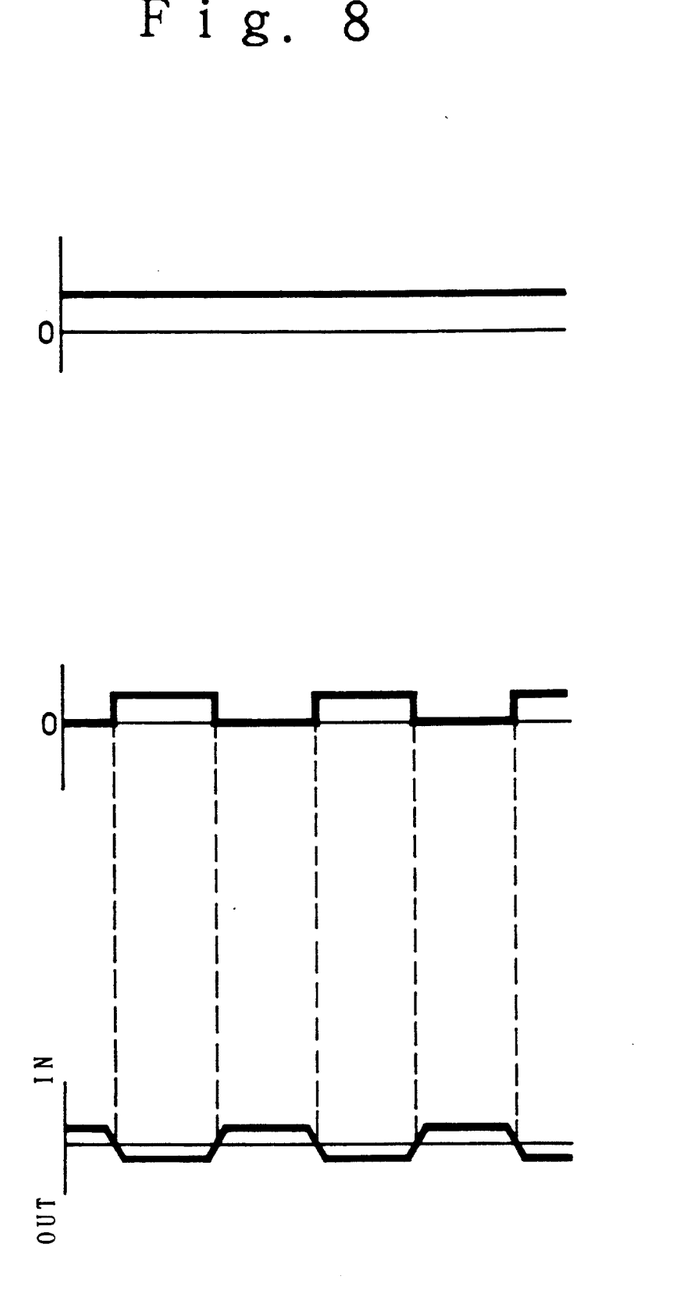
FIG. 8 is a time chart showing a relationship between rotational speed of motor, advancement speed of film and position of registration pins relative to perforations.

FIG. 8 is a time chart which shows relationship between rotational speed of the motor 6, advancement speed of the film f and position of the registration pin 22 relative to the perforation g when the film f is moved intermittently by frame and is held still. From this, it is seen that the motor 6 is driven at a predetermined rotational speed and that the film f is moved at a predetermined speed during the registration pins 22 being disengaged from the perforations g of the film f and is held still during the registration pins 22 being engaged with the perforations g.

Figure 7:
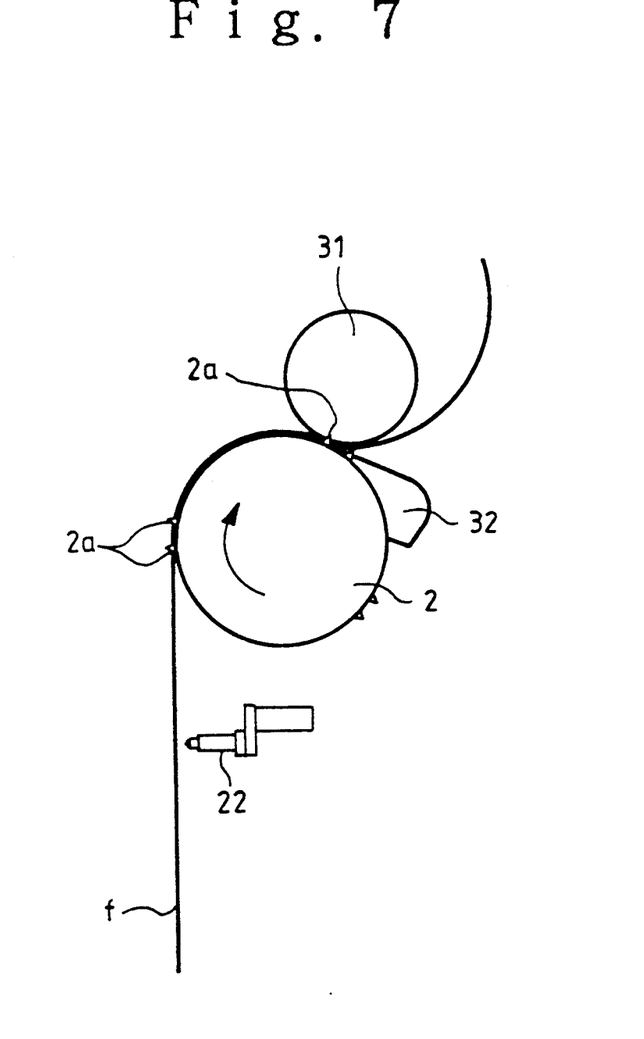
FIG. 7 is a schematic side view showing the movement of the sprocket wheel and a position relationship between the registration pins and the film part-winding roll in a high speed film advancement.

Position relationship of the tooth pairs 2a of the sprocket wheels 2, the registration pins 22, the film part-winding roll 31 and the film guide 32 in a high speed continuous advancement of the film f is shown in FIG. 7.

As shown in FIG. 7, in a high speed continuous advancement of the film f, the leading ends of the registration pins 22 are normally away from the perforations g of the film f to their inactive positions and two tooth pairs 2a of the sprocket wheels 2 are normally in engagement with the perforations g of the film f. Thus, the film f is partly wound over the film part-winding roll 31 and then moved upwardly.

Figure 9:
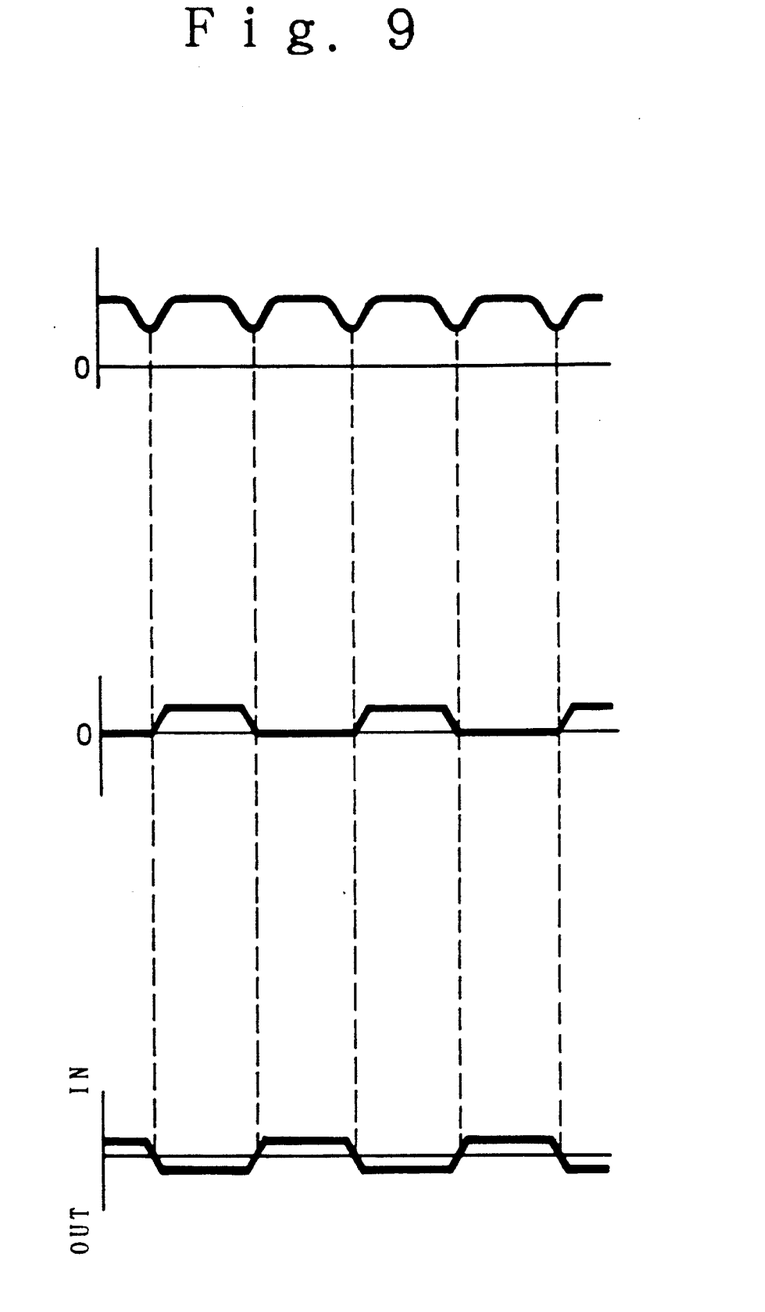
FIG. 9 is another time chart showing a relationship between rotational speed of motor, advancement speed of film and position of registration pins relative to perforations.

The motor 6 both for intermittently moving the film f and for continuously moving the film f at high speed normally rotates at a predetermined rotational speed; but if the rotational speed of the motor 6 is slowed down at the end and the start of the intermittent frame-by-frame film advancement stroke, the engagement with and disengagement of the tooth pairs 2a of the sprocket wheels 2 and the registration pins 22 from the perforations g are carried out relatively slowly so that the tooth pairs 2a and the registration pins 22 do not apply strong forces to the film f and consequently the film f is prevented from wear and/or tear. Rotational speed of the motor 6, advancement speed of the film f and position of the registration pins 22 relative to the perforations g in this case are illustrated in FIG. 9.

Obtained in the preferred embodiment described above with reference to FIGS. 3–9 is performance of more than 30 frames per second in the case of intermittent frame-by-frame film advancement and 200 frames per second in continuous high-speed film advancement.

It is to be understood that the present invention is not limited to the above-described embodiment and that various modifications may be made without leaving the true spirit of the present invention. For instance, so far the description has been made with reference to the film being 35 mm in width and having four perforations per frame at each side, but the present invention is applicable to any films regardless of their types and sizes. The sprocket wheel having three tooth pairs has been referred to, but a sprocket wheel with one tooth pair or more than two tooth pairs may be also used. The angular displacement angle $\theta$ of the film may be suitably selected depending upon size of sprocket wheels which intermittently move the film by frame, size of the film and the number of perforations of each frame of the film and so on.

A sprocket wheel and a device for advancing a film using said sprocket wheels in accordance with the present invention have the following major features and advantages:

(i) Peripheral portions of a sprocket wheel with teeth are equiangurally spaced apart from each other and periodically engage with the perforations of the film so that the film can be advanced in a simple and positive manner without involving complicated motion.

(ii) The teeth of the sprocket wheel smoothly engage with and disengage from the perforations of the film so that they impart no great forces to the film and any damage of the film is prevented.

(iii) The film is held still by the registration pins without using any electric control so that the film can be held in position with a high degree of accuracy.

(iv) In continuous high speed advancement of the film, it is not necessary to transport the film to any other device or equipment so that the operation is simplified.

(v) Because of the advantages (i)–(iv) described above, operation time is shortened and the film is ensured to be free from wear and tear.

What is claimed is:

1. A device for advancing a film comprising a first shaft extending laterally of the film and having sprocket wheels including some peripheral portions with no tooth so that when the film is stopped, teeth of the sprocket wheel do not engage with perforations of the film, a second shaft extending substantially in parallel with the first shaft and having a cam, first power transmission means for interconnecting the first and second shafts, a third shaft extending substantially in parallel with said second shaft having a cam follower for diametrically clamp said cam and second power transmission means, said third shaft being adapted to be rotated through said cam follower by rotation of the cam and a fourth shaft extending perpendicular to said third shaft and adapted to be reciprocated axially of the fourth shaft by said second power transmission means, said fourth shaft having registration pins engageable with the perforations of the film upon stoppage of the film during frame-by-frame advancement of the film.

2. The device according to claim 1 wherein said first power transmission means for interconnecting the first and second shafts is releasable and further means is provided for increasing a film part-winding angle relative to the sprocket wheels such that any one or more of the teeth of the sprocket wheels normally engages with the perforations of the film.

3. A sprocket wheel for advancing a film, said sprocket wheel having a periphery and teeth projecting radially from said periphery for engagement with perforations of said film, said teeth being circumferentially spaced about said periphery that for predetermined periods of rotation of said sprocket wheel no tooth is in engagement with a film perforation and advancement of said film is stopped during said periods for frame-by-frame advancement of said film.

* * * * *